United States Patent
Kordonowy et al.

(10) Patent No.: US 10,354,305 B2
(45) Date of Patent: Jul. 16, 2019

(54) METHOD, MEDIUM, AND SYSTEM FOR WORKFLOW MANAGEMENT IN AN ONLINE REVERSE AUCTION

(71) Applicant: Caterpillar Inc., Peoria, IL (US)

(72) Inventors: Scott L. Kordonowy, Shorewood, IL (US); Carl Halder Rempert, Dunlap, IL (US); Corey Calvin Eadie, East Peoria, IL (US); Michael James Kiesewetter, Plainfield, IL (US); Stefanie Jo Maloney, East Peoria, IL (US); Paul Gerard Basler, Dunlap, IL (US)

(73) Assignee: Caterpillar Inc., Deerfield, IL (US)

( * ) Notice: Subject to any disclaimer, the term of this patent is extended or adjusted under 35 U.S.C. 154(b) by 404 days.

(21) Appl. No.: 15/248,548

(22) Filed: Aug. 26, 2016

(65) Prior Publication Data

US 2018/0060930 A1 Mar. 1, 2018

(51) Int. Cl.
*G06Q 30/00* (2012.01)
*G06Q 30/06* (2012.01)

(52) U.S. Cl.
CPC .............. *G06Q 30/0611* (2013.01)

(58) Field of Classification Search
CPC ............................... G06Q 30/0611
See application file for complete search history.

(56) References Cited

U.S. PATENT DOCUMENTS

| | | | | |
|---|---|---|---|---|
| 7,693,748 | B1* | 4/2010 | Mesaros | G06Q 30/06 705/1.1 |
| 2002/0046147 | A1* | 4/2002 | Livesay | G06Q 10/06 705/37 |
| 2004/0015391 | A1* | 1/2004 | Dupreez | G06Q 30/06 705/37 |
| 2013/0246118 | A1* | 9/2013 | Dyess | G06Q 30/0206 705/7.25 |
| 2016/0358235 | A1* | 12/2016 | De Langis | G06Q 30/0605 |

OTHER PUBLICATIONS https://en.wikipedia.org/w/index.php?title=Bidding&oldid=732993133 (Year: 2016).*

* cited by examiner

*Primary Examiner* — Matthew E Zimmerman
(74) *Attorney, Agent, or Firm* — Harrity & Harrity LLP (57) ABSTRACT

A workflow management and online reverse auction system includes a non-transitory computer readable medium storing a program. The program causes a computer to execute steps of posting electronic part details for a part to be sourced to an online reverse auction site, and receiving electronic bids including prices for supplying the part to be sourced through the online reverse auction site from a plurality of suppliers. The program also causes the computer to execute steps of selecting a chosen supplier from the plurality of suppliers based on the electronic bids, and providing an option for the chosen supplier to extend an initial supplier agreement duration by accepting an additional supplier agreement term beneficial to a buyer.

20 Claims, 10 Drawing Sheets

FIG. 1

RFQ - Supplier Auctions

Auctions Available for Tube Supplier 15:
View: ⦿ Open Auctions ○ Closed Auctions ○ Starting Bids Show [10] entries                                                                                   Search: [       ]  Excel

| Part Number | Part Name | Tube OD  | Attachment Methods | Receiving Facilities | Your Last Bid | Winning Bid | Status  | Time Left  |       |
|-------------|-----------|----------|--------------------|----------------------|---------------|-------------|---------|------------|-------|
| 428-2301    | Tube-As   | 27.2 mm  | 1E4520             | 88 CZ                | $124.05       | $124.05     | Winning | 34m        | Bid   |
| 273-5375    | Tube-As   | 76.2 mm  | 1E1154             | 12                   | $43.21        | $50.35      | Outbid  | 55m        | Bid   |
| 361-8211    | Tube-As   | 50.8 mm  | 1E5291             | 16                   | $-            | $117.52     | No Bid  | 1h 25m     | Bid   |
| 236-6735    | Tube-As 74| 25.4 mm  | 1E2719             | 14.16                | $-            | $110.97     | No Bid  | 3h 13m     | Bid   |
| 364-3435    | Tube-As   | 63.5 mm  | 1E3806             | 88                   | $113.72       | $113.72     | Winning | 4h 12m     | Bid   |
| 268-7635    | Tube-As   | 48.6 mm  | 1E5411             | DQ                   | $-            | $305.58     | No Bid  | 7h 39m     | Bid   |
| 407-9999    | Tube-As   | 42.7 mm  | 1E1592             | CZ                   | $-            | $70.05      | No Bid  | 11h 43m    | Bid   |
| 469-8463    | Tube-As   | 12.7 mm  | 1E9022             | CZ                   | $93.01        | $93.01      | Winning | 12h 59m    | Bid   |
| 336-8515    | Tube-As   | 9.53 mm  | 1E5877             | 12                   | $133.33       | $201.73     | Outbid  | 1d 2hr 20m | Bid   |
| 486-5364    | Tube-As   | 38.1 mm  | 1E6064             | 12                   | $128.53       | $468.59     | Outbid  | 2d 12h 32m | Bid   |

Showing 1 to 10 of 37 entries

RFQ - Supplier Matrix

Supplier Matrix

| | Weld | Braze | OD Range1 | OD Range2 | OD Range3 | OD Range4 |
|---|---|---|---|---|---|---|
| Tube Supplier 1 | Yes | No | No | No | No | No |
| Tube Supplier 2 | No | Yes | No | Yes | No | No |
| Tube Supplier 3 | No | No | No | Yes | No | No |
| Tube Supplier 4 | Yes | No | Yes | No | Yes | Yes |
| Tube Supplier 5 | No | No | Yes | Yes | No | No |
| Tube Supplier 6 | No | No | No | Yes | Yes | Yes |
| Tube Supplier 7 | No | No | Yes | No | Yes | Yes |
| Tube Supplier 8 | Yes | No | Yes | No | Yes | No |
| Tube Supplier 9 | Yes | No | Yes | Yes | Yes | Yes |
| Tube Supplier 10 | Yes | Yes | No | Yes | No | No |
| Tube Supplier 11 | No | Yes | No | Yes | No | Yes |
| Tube Supplier 12 | No | Yes | No | Yes | No | Yes |
| Tube Supplier 13 | Yes | No | No | No | Yes | No |
| Tube Supplier 14 | No | No | No | No | No | No |
| Tube Supplier 15 | No | No | No | No | No | No |
| Tube Supplier 16 | Yes | Yes | No | Yes | Yes | No |
| Tube Supplier 17 | Yes | Yes | No | No | Yes | No |
| Tube Supplier 18 | Yes | Yes | No | No | Yes | No |

RFQ - Part — 90

| | |
|---|---|
| Part Number | 428-2301 |
| Part Name | Tube-As |
| Change Number | 3 |
| Bulk Tube | 3D-1029 |
| TubeOD | 27.2mm |
| Bulk Tube 1E Spec | 1E4520B |
| End Connection Type 1 | Braze |
| End Fitting 1 | 348-0452 |
| End Fitting 1 Cost From ILC | $12.32 |
| End Connection Type 2 | Mechanical Joint |
| End Fitting 2 | 348-0882 |
| End Fitting 2 Cost From ILC | $14.23 |
| Estimated Annual Volume | 1,548 |
| Receiving Facilities | 88.CZ |
| Packaging Requirements | Individually Bagged |

Excel — 92

RFQ - Bidding Information

Current Bid: $124.05 [Your Bid]
New Bid: $122.20
Locked Supplier Duration: ___ years
(guaranteed 2% annual cost reduction)
☐ Deviation Required?

RFQ - Questions and Comments

To: -Select One-
Message:

[Send]

Time Remaining: 3 days 2 hours 45 min 2 sec.

[Submit] [No Quote]

RFQ - Bidding History

Excel

Show [10] entries      Search: [        ]

| Bid Time | Bidder | Bid |
|---|---|---|
| 5/20/2016 01:12.55 | Tube Supplier 15 | $124.05 |
| 5/20/2016 07:30.21 | Other | $136.46 |
| 5/19/2016 14:24.60 | Other | $150.10 |
| 5/19/2016 12:02.32 | Tube Supplier 15 | $165.11 |
| 5/19/2016 08:06.47 | Other | $185.52 |
| 5/19/2016 12:00.00 | Opening Bid | $199.75 |

Showing 1 to 6 of 6 entries

FIG. 4

RFQ - Part

| | |
|---|---|
| Part Number | 428-2301 |
| Part Name | Tube-As |
| Change Number | 3 |
| Bulk Tube | 3D-1029 |
| TubeOD | 27.2mm |
| Bulk Tube 1E Spec | 1E4520B |
| End Connection Type 1 | Braze |
| End Fitting 1 | 348-0452 |
| End Fitting 1 Cost From ILC | $12.32 |
| End Connection Type 2 | Mechanical Joint |
| End Fitting 2 | 348-0882 |
| End Fitting 2 Cost From ILC | $14.23 |
| Estimated Annual Volume | 1,548 |
| Receiving Facilities | 88.CZ |
| Packaging Requirements | Individually Bagged |

Excel

RFQ - Bidding Information

Current Bid: $124.05
Time Remaining:
Available Suppliers

| Supplier | Active Bid | Blind Bid |
|---|---|---|
| Tube Supplier 1 | No | Yes |
| Tube Supplier 2 | No | No |
| Tube Supplier 3 | Yes | Yes |
| Tube Supplier 4 | No | Yes |
| Tube Supplier 5 | Yes | Yes |
| Tube Supplier 6 | Yes | Yes |
| Tube Supplier 7 | No | No |

RFQ - Questions and Comments

To: -Select One-
Message:

[ Send ]

RFQ - Bidding History

Excel

Show 10 entries        Search:

| Bid Time | Bidder | Locked in Years | Bid | Deviation | On Time Shipping | On Time Delivery | PPM | |
|---|---|---|---|---|---|---|---|---|
| 5/20/2016 01:12.55 | Tube Supplier 15 | 2 | $124.05 | Yes | 87% | 84% | 1010 | Award |
| 5/20/2016 07:30.21 | Tube Supplier 4 | 3 | $126.46 | | 94% | 94% | 205 | Award |
| 5/20/2016 14:24.50 | Tube Supplier 5 | 1 | $130.10 | | 98% | 95% | 604 | Award |
| 5/20/2016 12:02.32 | Tube Supplier 15 | 2 | $135.11 | | 93% | 98% | 242 | Award |
| 5/20/2016 08:06.47 | Tube Supplier 4 | 3 | $141.62 | Yes | 92% | 89% | 645 | Award |
| 5/20/2016 12:00.00 | Opening Bid | | $149.78 | | | | | |

Showing 1 to 6 of 6 entries

| RFQ - Buyer Dashboard | | | | | | |
|---|---|---|---|---|---|---|
| | | | | | | Excel |
| 12<br>Active Auctions | Supplier | Qualified Auctions | Auctions Won | Auctions Lost | Active Auctions | Winning Percentage |
| | Tube Supplier 19 | 133 | 66 | 66 | 1 | 50% |
| | Tube Supplier 18 | 192 | 168 | 19 | 5 | 90% |
| | Tube Supplier 17 | 140 | 55 | 82 | 3 | 40% |
| 37<br>Ready to Award | Tube Supplier 16 | 124 | 63 | 67 | 4 | 53% |
| | Tube Supplier 15 | 105 | 93 | 9 | 3 | 91% |
| | Tube Supplier 14 | 120 | 84 | 33 | 3 | 72% |
| | Tube Supplier 13 | 105 | 63 | 37 | 5 | 63% |
| 5<br>Starting Bids | Tube Supplier 12 | 189 | 62 | 125 | 2 | 33% |
| | Tube Supplier 11 | 152 | 55 | 92 | 5 | 37% |
| | Tube Supplier 10 | 113 | 67 | 41 | 5 | 62% |
| | Tube Supplier 9 | 141 | 102 | 36 | 3 | 74% |
| 5<br>Active Auctions | Tube Supplier 8 | 174 | 159 | 13 | 2 | 92% |
| | Tube Supplier 7 | 126 | 116 | 6 | 4 | 95% |
| | Tube Supplier 6 | 130 | 103 | 25 | 2 | 80% |
| | Tube Supplier 5 | 147 | 65 | 78 | 4 | 45% |
| | Tube Supplier 4 | 113 | 75 | 36 | 2 | 68% |
| | Tube Supplier 3 | 101 | 67 | 31 | 3 | 68% |
| | Tube Supplier 2 | 154 | 152 | 1 | 1 | 99% |
| | Tube Supplier 1 | 175 | 102 | 72 | 1 | 59% |

METHOD, MEDIUM, AND SYSTEM FOR WORKFLOW MANAGEMENT IN AN ONLINE REVERSE AUCTION

TECHNICAL FIELD

The present disclosure relates generally to an online reverse auction system for parts to be sourced, and more particularly to workflow management strategies for sourcing the parts.

BACKGROUND

Procurement, which plays a major role in many businesses, is a process that includes the buying of goods or services. For many companies, especially relatively large companies, procurement may be a tedious process including a number of steps, many of which may be performed manually. As a result, those involved in the procurement process may limit the number of suppliers invited to participate in the process, thus reducing the competition that drives down prices. In addition, and particularly when a high volume of different goods or services are sourced, the use of multiple sourcing is avoided to reduce complexity of the process. Further, those involved in procurement may lose track of when an agreement with a supplier should be renegotiated.

As should be appreciated, there is a continuing need to improve the procurement process, and more particularly the sourcing component of the procurement process, by reducing complexity, improving quality and achieving efficiencies. The present disclosure is directed to such an endeavor.

SUMMARY OF THE INVENTION

In one aspect, a workflow management and online reverse auction system includes a non-transitory computer readable medium storing a program. The program causes a computer to execute steps of posting electronic part details for a part to be sourced to an online reverse auction site, and receiving electronic bids including prices for supplying the part to be sourced through the online reverse auction site from a plurality of suppliers. The program also causes the computer to execute steps of selecting a chosen supplier from the plurality of suppliers based on the electronic bids, and providing an option for the chosen supplier to extend an initial supplier agreement duration by accepting an additional supplier agreement term beneficial to a buyer.

In another aspect, a workflow management and online reverse auction system includes a non-transitory computer readable medium storing a program. The program causes a computer to execute steps of receiving an indication that a trigger condition associated with a part is satisfied, and posting electronic part details for the part to an online reverse auction site based on the step of receiving the indication that the trigger condition associated with the part is satisfied. The program also causes the computer to execute steps of receiving electronic bids including prices for supplying the part through the online reverse auction site from a plurality of suppliers, and selecting a chosen supplier from the plurality of suppliers based on the electronic bids.

In another aspect, a method for providing a workflow management and online reverse auction system includes steps of posting electronic part details for a part to be sourced to an online reverse auction site, and receiving electronic bids including prices for supplying the part to be sourced through the online reverse auction site from a plurality of suppliers, and selecting a chosen supplier from the plurality of suppliers based on the electronic bids. The method also includes steps of providing an option for the chosen supplier to extend an initial supplier agreement duration by accepting an additional supplier agreement term beneficial to a buyer, and automatically re-posting the electronic part details for the part to be sourced when a trigger condition associated with the part is satisfied.

DETAILED DESCRIPTION

Figure 1:
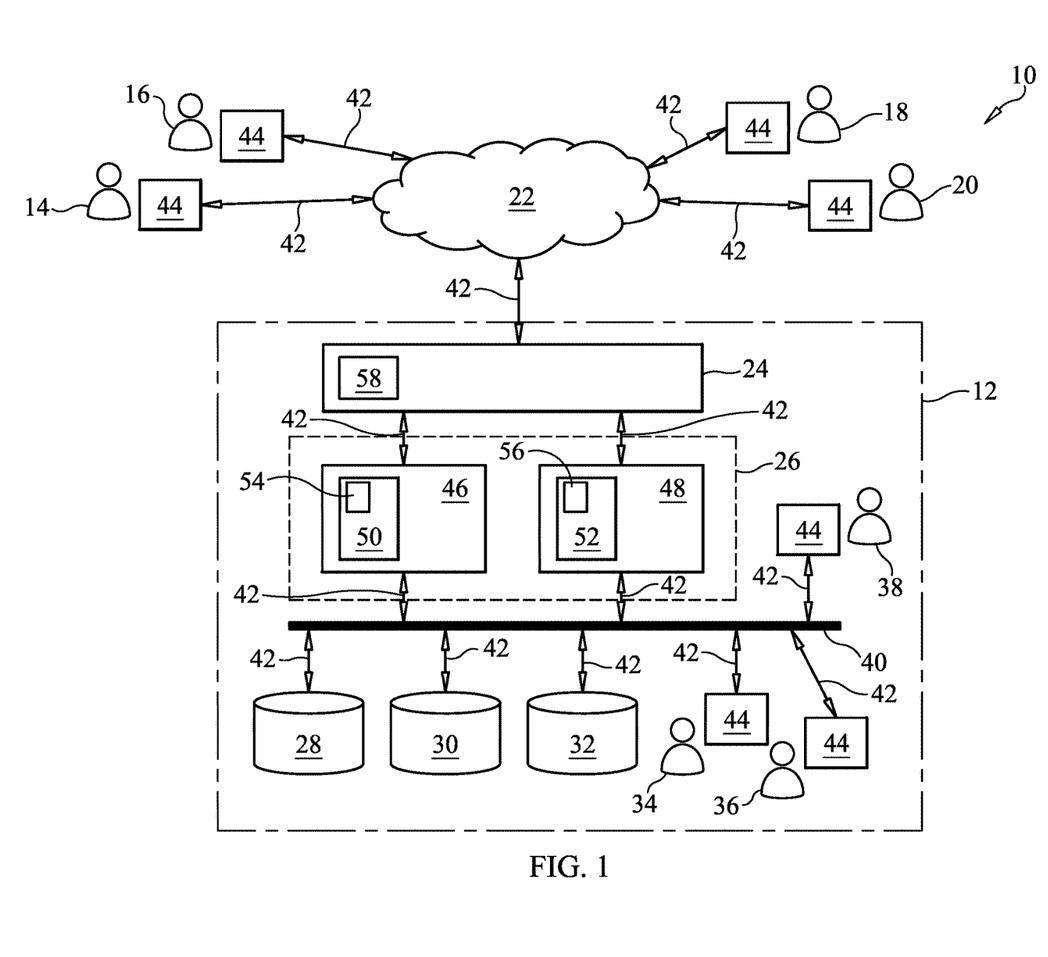
FIG. 1 is a schematic diagram of a system architecture for an exemplary workflow management and online reverse auction system, according to the present disclosure.

An exemplary workflow management and online reverse auction system according to the present disclosure is shown generally at 10 in FIG. 1. The workflow management and online reverse auction system 10 generally includes a buyer side 12, which may host an online reverse auction site, discussed below, accessible by a plurality of suppliers 14, 16, 18 and 20 through a public network 22, such as the Internet. The buyer side 12 may include, among a number of additional and/or alternative components, a web server, or computer, 24, an application server, or computer, 26, and a plurality of databases 28, 30 and 32, which may include or interface with one or more database servers.

Buyers 34, 36 and 38 may access various components of the buyer side 12 of the workflow management and online reverse auction system 10 using a local, private or public network. For example, a simple local bus network 40 is depicted as facilitating communication between the buyer side components. However, it should be appreciated that various wired and/or wireless communication schemes may be used that incorporate various conventional communication protocols and/or data port interfaces. Communication links are shown generally at 42 to represent exchange of information between components, regardless of the communication scheme that is utilized.

The buyers 34, 36 and 38 may access the buyer side components using one or more electronic devices 44 such as, for example, desktop computers, laptop computers, smartphones, or tablets. The electronic devices 44 may each include one or more of a central processing unit, memory, display functionality and operating system that runs programs and/or apps for performing different functions. Similarly, the suppliers 14, 16, 18 and 20 may use one of a plurality of different electronic devices 44, such as those referenced above for use by buyers 34, 36 and 38, to access the public network 22. Any number, including a large number, of suppliers 14, 16, 18 and 20 and buyers 34, 36 and 38 are contemplated for using the workflow management and online reverse auction system 10.

The application server 26 may include applications, or programs, pertaining to the workflow management and online reverse auction system 10. The application server 26, or set of servers, may be referenced as a computer and may include one or more devices having one or more processors, memory, storage, a display, a network interface, and an input/output device, for example. The processor, or processors, may execute unique sets of instructions, which may be implemented as computer readable program code, stored in memory or storage, such that the application server 26, or server system, is configured as a special purpose system.

In particular, hardware, software, and particular sets of instructions may transform the application server 26 into at least a portion of the workflow management and online reverse auction system 10. As should be appreciated by those skilled in the art, the application server 26 may include, in addition to hardware components, an application layer and an interface layer that may include or provide a variety of user interfaces permitting direct or indirect interaction between the application server 26 and the electronic devices 44.

Among other modules, the application server, or computer, 26 may include a workflow management module 46 and an online reverse auction module 48. It should be appreciated that the use of the term "modules" is for ease of explanation, rather than limitation, and is intended to represent certain related aspects or functionality of the workflow management and online reverse auction system 10. Each of the workflow management module 46 and the online reverse auction module 48 may include a non-transitory computer readable media 50 and 52, respectively, storing a respective program, or computer readable program codes, 54 and 56 representing processes for performing specific tasks of the workflow management and online reverse auction system 10. The tasks may be performed using a processor, or processors, and may require the access and/or manipulation of data stored in one or more of the databases 28, 30 and 32.

The web server 24, which may alternatively be a computer, may host an online reverse auction site 58. Similarly to the application server 26, the web server 24 may include hardware, software, and particular sets of instructions that transform the web server 24 into parts of the workflow management and online reverse auction system 10. The web server 24 may communicate directly or indirectly with the application server 26 and databases 28, 30 and 32, and may control the presentation and functionality of the online reverse auction site 58, as accessed by suppliers 14, 16, 18 and 20 using web browsers on electronic devices 44. Buyers 34, 36 and 38 may access parts of the workflow management and online reverse auction system 10 through the online reverse auction site 58 and/or through direct or indirect communication with components of the buyer side 12.

The online reverse auction module 48 may post electronic part details for a part to be sourced to the online reverse auction site 58. For example, database 28 may be a parts database, storing electronic part details for parts entered manually or automatically on the buyer side 12. The online reverse auction module 48 may be configured to extract electronic part details for parts to be sourced from the parts database 28 and post them to the online reverse auction site 58, according to the computer readable program code 54. Although the functionality described herein is described as provided by one of the workflow management module 46 or the online reverse auction module 48, it should be appreciated that the disclosed functionality may be provided by either or both of the workflow management module 46 and the online reverse auction module 48, or may be performed by alternative modules. According to some embodiments, the online reverse auction module 48 may post thirty or more parts to be sourced per week.

Suppliers 14, 16, 18 and 20 may access the online reverse auction site 58 to view the electronic part details for parts to be sourced using electronic devices 44. The online reverse auction module 48 may include and/or implement rules pertaining to the various suppliers 14, 16, 18 and 20 and/or buyers 34, 36 and 38. For example, when one of the suppliers 14, 16, 18 and 20 registers, or is registered, for use of the online reverse auction site 58, an electronic account including credentials may be created and stored in the database 30, which may be a user database. Similarly, the buyers 34, 36 and 38 may each have electronic accounts including credentials stored in the user database 30. The online reverse auction module 48, and/or workflow management module 46, may be configured to ensure that each of the suppliers 14, 16, 18 and 20 and buyers 34, 36 and 38 is provided with appropriate access and capabilities with regard to the workflow management and online reverse auction system 10.

Figure 2:
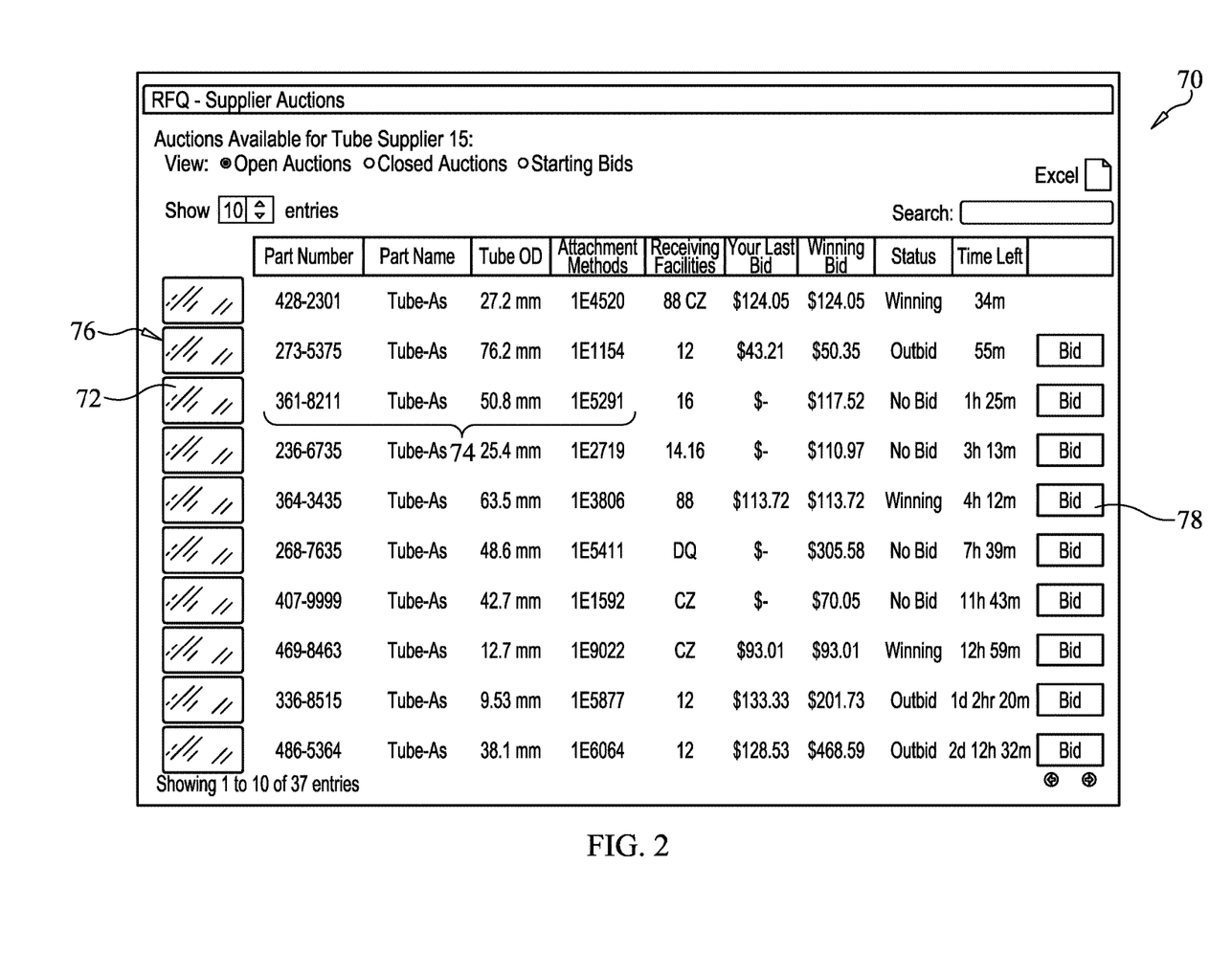
FIG. 2 depicts an exemplary screen shot of an auction page, wherein a supplier may access parts to be sourced.

After logging on to the online reverse auction site 58, the suppliers 14, 16, 18 and 20 may be presented with an auction page 70, a screen shot of which is shown in FIG. 2. The auction page 70 may include a listing of parts and electronic part details for parts to be sourced. For example, as shown in FIG. 2, electronic part details, including part number and part name, may be presented in rows, with one or more links available for viewing additional electronic part details. Page layout and electronic part details displayed for the suppliers 14, 16, 18 and 20 may vary depending on the particular application.

An exemplary part to be sourced is shown at 72, with electronic part details 74 for the exemplary part to be sourced 72 being presented along row 76. From the auction page 70, suppliers 14, 16, 18 and 20 may view open auctions, closed auctions and starting bids, for example, and may have the option to bid on parts to be sourced, such as the exemplary part to be sourced 72, when viewing the open auctions. According to the exemplary embodiment, the suppliers 14, 16, 18 and 20 may place electronic bids including prices for supplying the exemplary part to be sourced 72 and/or additional parts to be sourced by selecting a bid button 78 along row 76.

According to some embodiments, the online reverse auction module 48, and/or workflow management module 46, may be configured to automatically direct electronic part details to electronic accounts corresponding to qualified suppliers of the plurality of suppliers 14, 16, 18 and 20. That is, for example, the online reverse auction module 48 may be configured to select one or more qualified suppliers from an electronic supplier matrix, shown at 80 in FIG. 3, which may be stored in the user database 30, or may be otherwise stored and accessed by the workflow management and online reverse auction system 10.

Figure 3:
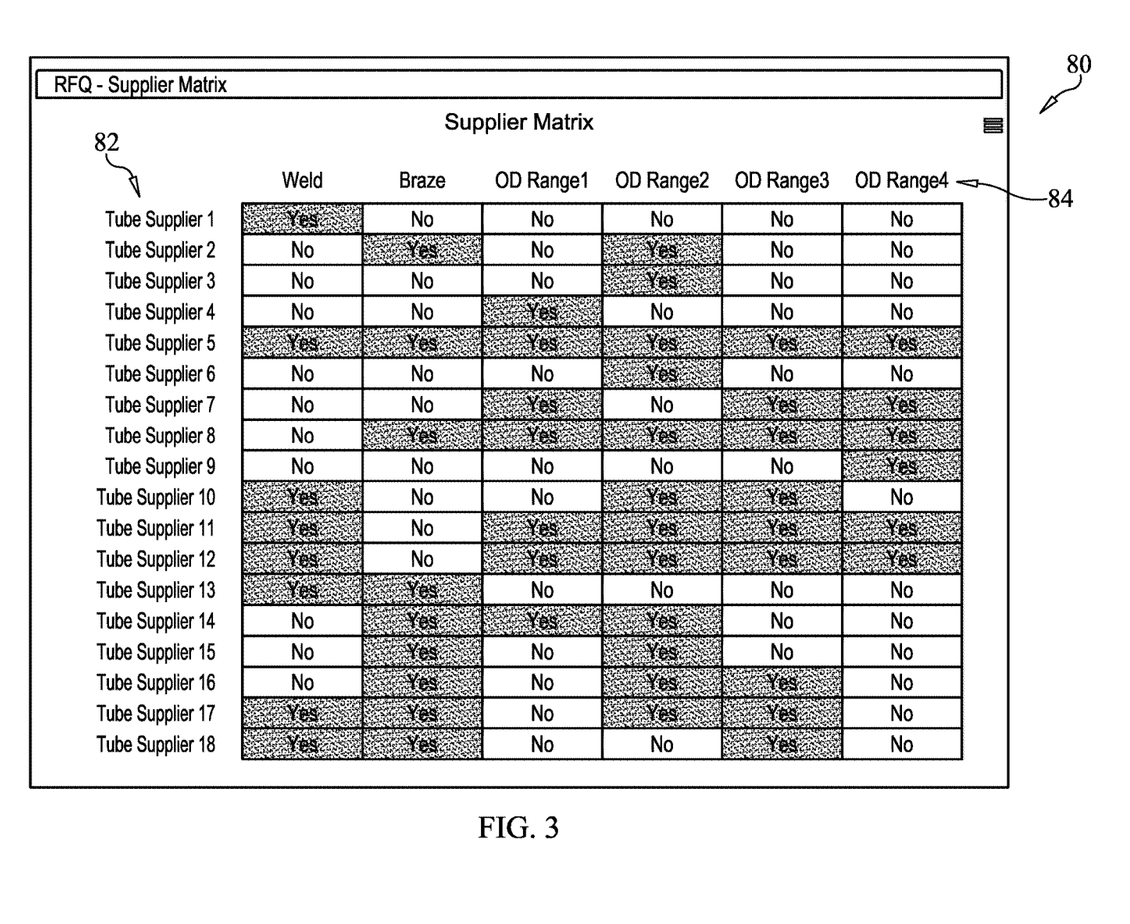
FIG. 3 depicts an exemplary screen shot of a supplier matrix page, wherein a buyer may view a listing of suppliers.

Qualified suppliers, of the plurality of suppliers 14, 16, 18 and 20, may be selected based on the electronic part details or other criteria for the part to be sourced. That is, particular capabilities may be required or preferred when selecting a supplier for a specific part. As such, the online reverse auction module 48, and/or workflow management module 46, may query the electronic supplier matrix 80, identify or select qualified suppliers from a listing of suppliers 82, which may include one or more of suppliers 14, 16, 18 and 20, based on recommended or preferred capabilities, such as one or more of capabilities 84, pertaining to the part to be sourced, and direct the electronic part details only to those of the listing of suppliers 82 that are deemed qualified.

Figure 4:
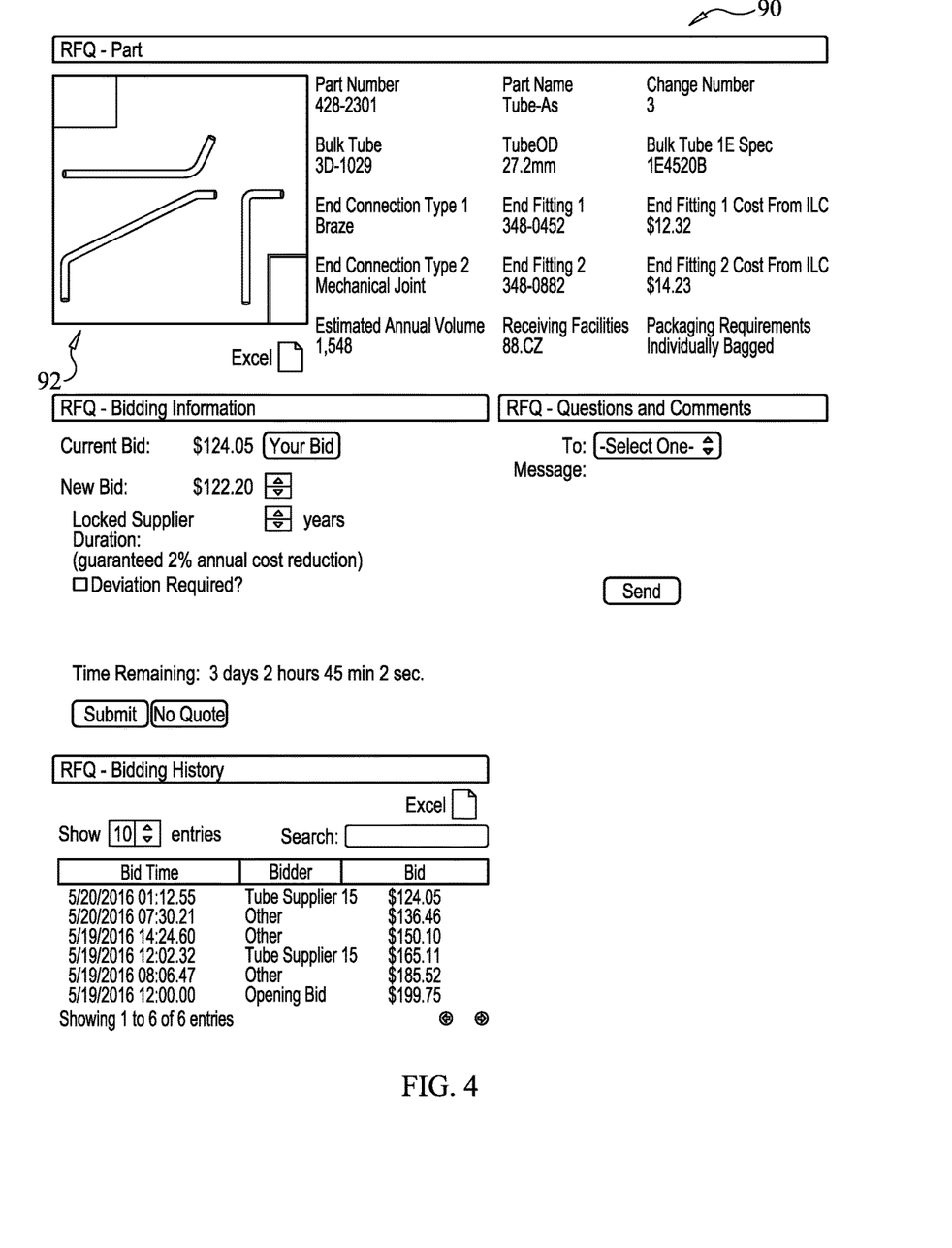
FIG. 4 depicts an exemplary screen shot of a part information page, wherein a supplier may access electronic part details for a part to be sourced.

FIG. 4 depicts an exemplary screen shot of a part information page 90, which may be accessed by selecting a link to additional electronic part information from the auction page 70. That is, one of the suppliers 14, 16, 18 and 20 may, from the auction page 70, select a link associated with a particular part to be sourced to view additional electronic part details. According to some embodiments, the online reverse auction module 48 may additionally and automatically supply print attributes 92 corresponding to the part to be sourced to the electronic part details from the parts database 28.

Figure 5:
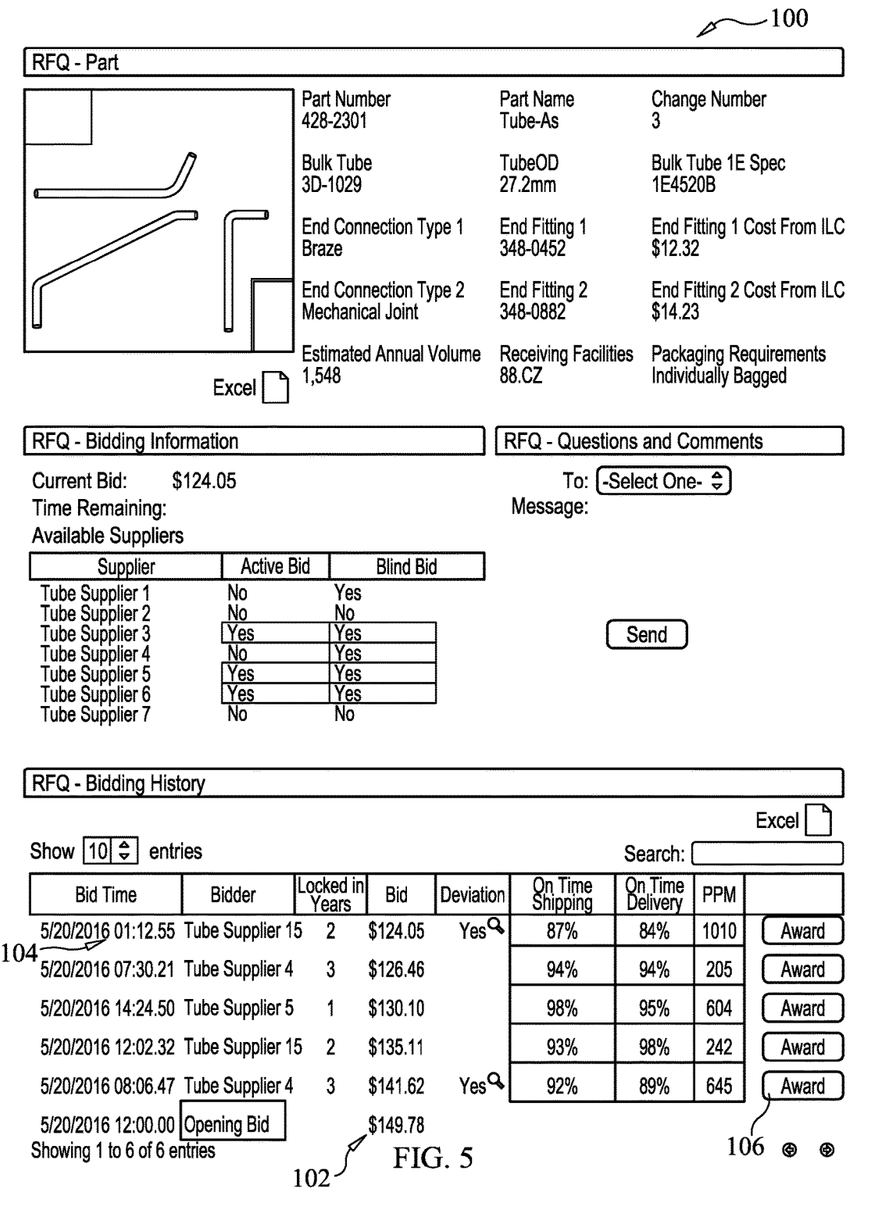
FIG. 5 depicts an exemplary screen shot of an auction summary page, wherein a buyer may review bids for a part to be sourced and select a chosen supplier.

The online reverse auction module 48 may also receive electronic bids including prices for supplying the parts to be sourced through the online reverse auction site 58 from one or more of the suppliers 14, 16, 18 and 20. The bidding process may occur in real-time, with the workflow management and online reverse auction system 10 being capable of handling a large volume of electronic bids. FIG. 5 depicts an exemplary screen shot of an auction summary page 100, wherein one or more of the buyers 34, 36 and 38 may review an electronic summary of the electronic bids for a part to be sourced, and select a chosen supplier. That is, the online reverse auction module 48 may be configured to display the electronic summary for electronic accounts corresponding to the buyers 34, 36 and 38.

According to one example, and referring still to FIG. 5, one of the buyers 34, 36 and 38 may view the electronic bids, including prices, 102, and select a chosen supplier 104 by selecting an award button 106 corresponding to the chosen supplier 104. Although the buyers 34, 36 and 38 may select, or approve of, the chosen supplier 104, the online reverse auction module 48 may be configured to additionally or alternatively select the chosen supplier 104 after expiration of a predetermined period of time. The chosen supplier 104 may be selected based on prices 102 and/or alternative criteria.

The online reverse auction module 48 and/or the workflow management module 46 may have additional and/or alternative functionality. For example, and referring now to FIG. 6, the online reverse auction module 48 may generate or provide an electronic supplier agreement 105. The electronic supplier agreement 105 may have various terms or sections, such as, for example, an identity of parties section 105*a*, a description of parts section 105*b*, an initial supplier agreement duration 105*c*, a buyer's obligations section 105*d*, a supplier's obligations section 105*e*, and a monetary section 105*f,* which may include costs and prices. Of course, the terms and conditions of each contract may vary and are set forth here as an example only.

Figure 6:
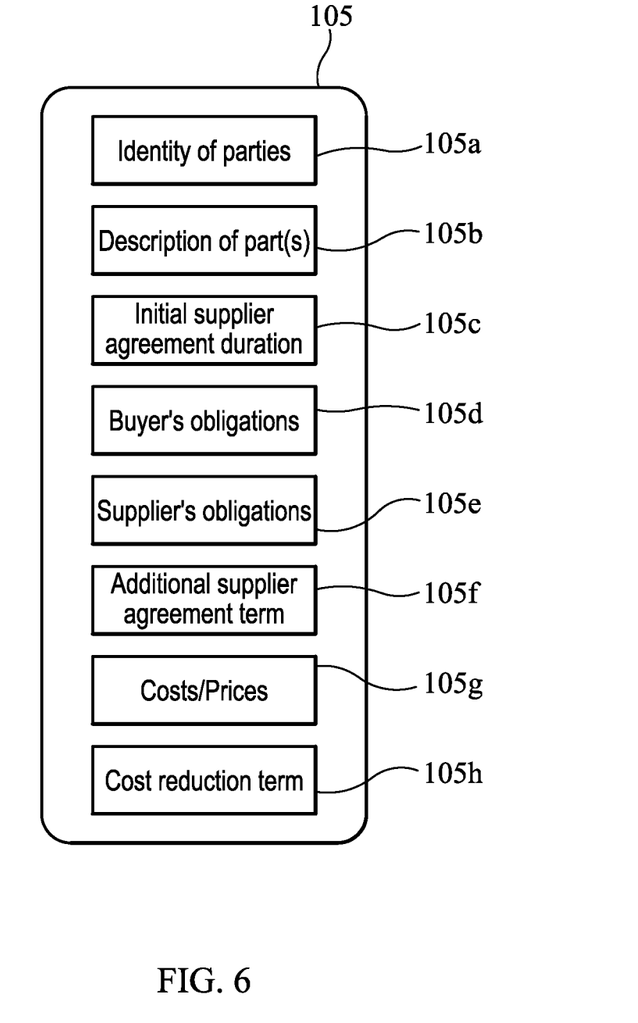
FIG. 6 is a simplified diagram of an exemplary electronic supplier agreement.

One or both of the online reverse auction module 48 and the workflow management module 46 may be configured to provide an option for the chosen supplier 104, which may be one of the suppliers 14, 16, 18 and 20, to extend the initial supplier agreement duration 105*c* by accepting an additional supplier agreement term 105*g* beneficial to the buyers 34, 36 and 38. For example, the computer readable program codes 54 and/or 56 may cause the online reverse auction site 58 to provide the option to extend the initial supplier agreement duration 105*c*, around or after the time the chosen supplier 104 has been selected, by accepting a cost reduction term 105*h*. The option may be a form of electronic negotiation and may be provided automatically or upon satisfaction of a condition or event.

Further, the online reverse auction module 48 and/or the workflow management module 46 may automatically post, or re-post, the electronic part details for the part to be sourced upon expiration of the initial supplier agreement duration and/or the extended supplier agreement duration. According to some embodiments, the workflow management module 46 may monitor an agreement and triggers database 32 to determine whether or not any triggers pertaining to supplier agreements have been satisfied. When an indication that a trigger condition is satisfied, the electronic part details for the applicable part may be automatically posted or re-posted to the online reverse auction site 58. According to some embodiments, electronic details for a part to be sourced may be posted or re-posted when part orders for the part have increased a predetermined amount. This may apply to supplier agreements having a year-to-year term, or to other agreements that should be periodically reviewed.

Figure 7:
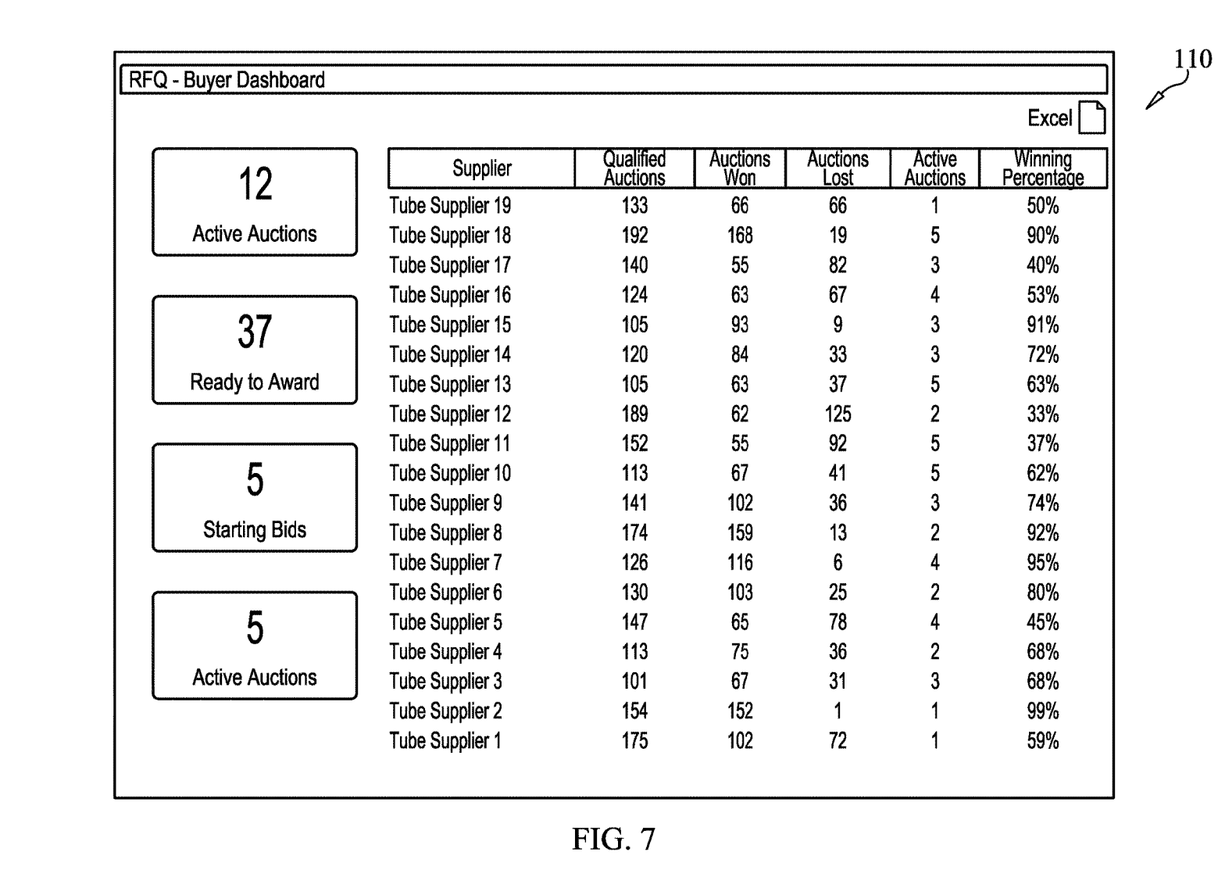
FIG. 7 depicts an exemplary screen shot of a buyer dashboard page, wherein a buyer may view auction summary and supplier information.

FIG. 7 depicts an exemplary screen shot of a buyer dashboard page 110, wherein one or more buyers 34, 36 and 38 may view auction summary and supplier information. Of course, this view can be customized to meet buyer needs, and may be available to some or all of the buyers 34, 36 and 38, depending on access restrictions. Similarly, information may be made available to the suppliers 14, 16, 18 and 20, and may be customized depending on needs and functionality requirements.

INDUSTRIAL APPLICABILITY

The present disclosure relates generally to a workflow management and online reverse auction system. More particularly, the present disclosure relates to an online reverse auction site for parts to be sourced. Yet further, the present disclosure relates to various methods of administering and operating the workflow management and online reverse auction system.

Referring generally to FIGS. 1-10, a workflow management and online reverse auction system 10 includes non-transitory computer readable medium 50 and 52 storing programs 54 and 56. The programs 54 and/or 56 may cause a computer, such as an application server 26 and/or a web server 24, to execute various steps to perform various actions.

Figure 8:
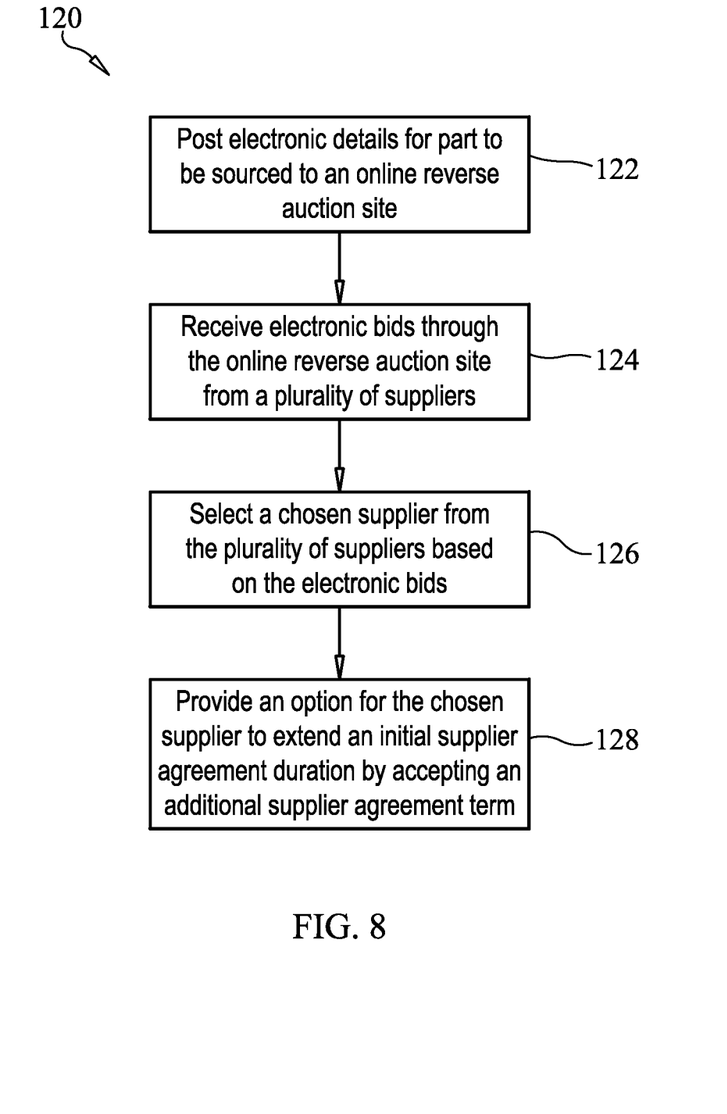
FIG. 8 is a flow diagram illustrating a first exemplary embodiment of an online reverse auction method.

According to an exemplary embodiment, a method, illustrated in FIG. 8 at 120, may be implemented in whole or in part by the application server 26 and/or the web server 24. All or portions of the method may run continuously or intermittently, such as at predetermined intervals. In box 122, electronic part details 74 for a part to be sourced 72 are posted to an online reverse auction site 58. The workflow management and online reverse auction system 10 may then receive electronic bids including prices 102 through the online reverse auction site 58 from a plurality of suppliers 14, 16, 18 and 20, at box 124.

At box 126, the workflow management and online reverse auction system 10 facilitates selection of a chosen supplier, such as chosen supplier 104, based on the electronic bids including prices 102. The chosen supplier 104 may be selected automatically by the workflow management and online reverse auction system 10, such as at expiration of a predetermined period of time and/or based on the electronic bids including prices 102. According to some embodiments, one of the buyers 34, 36 and 38 may select the chosen supplier 104 through the online reverse auction site 58.

For example, one of the buyers 34, 36 and 38 may be presented with an auction summary page 100, from which a respective one of the buyers 34, 36 and 38 may review the electronic bids including prices 102 that have been received and select the chosen supplier 104. At box 128, the chosen supplier 104 may then be provided with, through the online reverse auction site 58 or otherwise, an option to extend the initial supplier agreement duration 105c by accepting an additional supplier agreement term 105g, such as a monetary section 105f, beneficial to buyers 34, 36 and 38.

Figure 9:
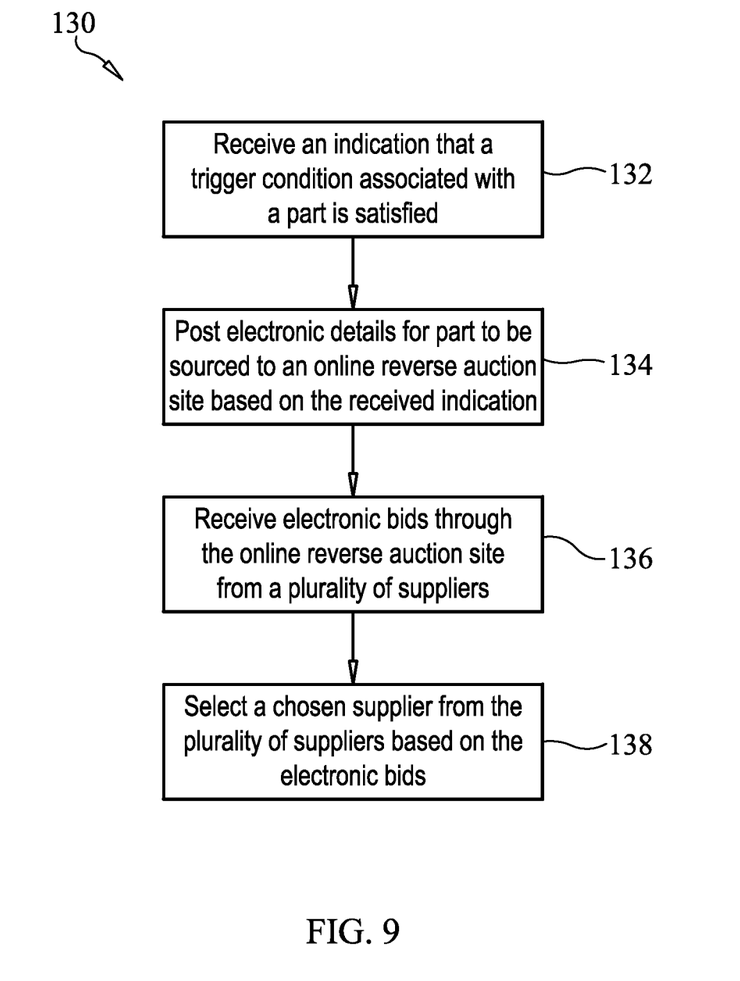
FIG. 9 is a flow diagram illustrating a second exemplary embodiment of an online reverse auction method.

Turning now to FIG. 9, an additional exemplary method according to the present disclosure is illustrated in a flow diagram 130. The method includes various steps, which may be implemented in whole or in part by the application server 26 and/or the web server 24. In particular, the method steps may be executed as part of one or both of the programs 54 and 56. The method may operate continuously or intermittently, and may or may not operate simultaneously with the exemplary method of FIG. 8.

At box 132, the method may receive an indication that a trigger condition associated with a part is satisfied. For example, various trigger conditions may be configured in the workflow management and online reverse auction system 10 and may include various events, such as expiration of an initial or extended supplier agreement duration, a predetermined increase in part orders for a part to be sourced 72, and/or various other events. Upon satisfaction of the trigger condition, electronic part details, such as electronic part details 74, for the corresponding part to be sourced 72 may be posted to the online reverse auction site 58 based on the received indication, at box 134.

At box 136, electronic bids, such as electronic bids including prices 102, are received through the online reverse auction site 58 from a plurality of suppliers 14, 16, 18 and 20. At box 138, the workflow management and online reverse auction system 10 facilitates selection of a chosen supplier 104 from the plurality of suppliers 14, 16, 18 and 20 based on the electronic bids including prices 102. The chosen supplier 104 may be selected automatically or manually through the workflow management and online reverse auction system 10.

Figure 10:
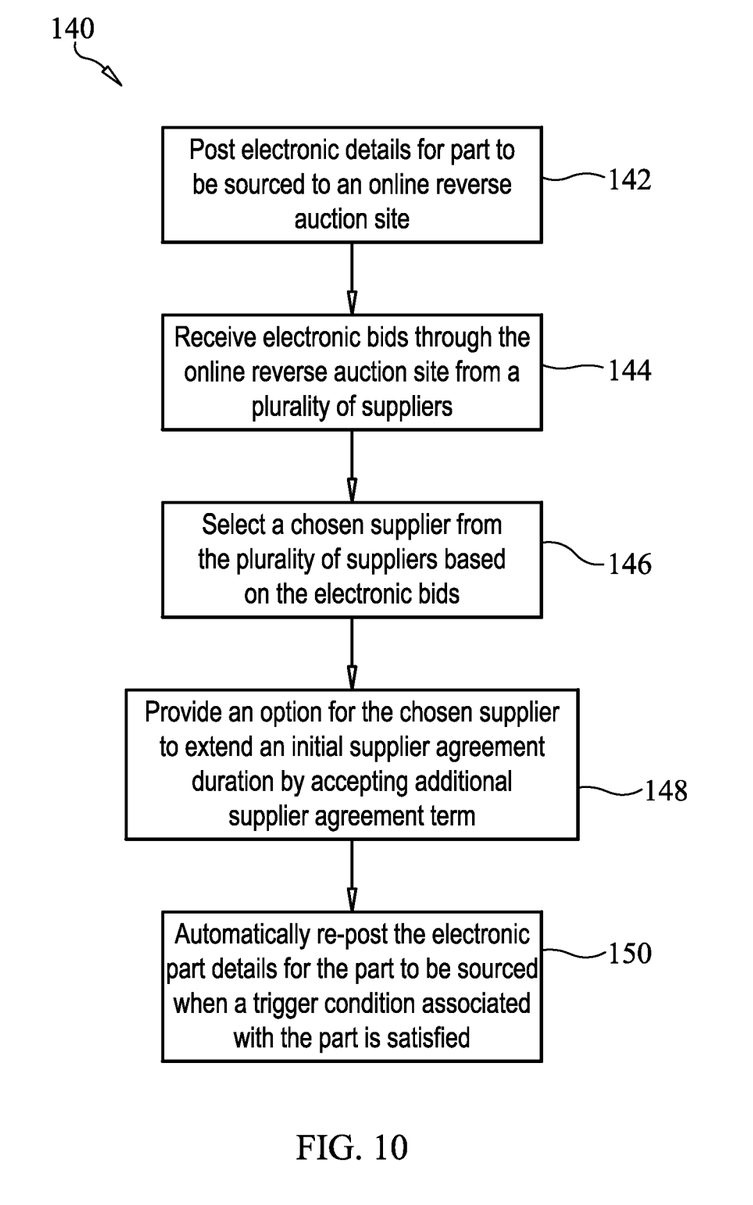
FIG. 10 is a flow diagram illustrating a third exemplary embodiment of an online reverse auction method.

Another exemplary method according to the present disclosure is shown as a flow diagram at 140 in FIG. 10. According to the method, and as shown at box 142, electronic part details 74 for a part to be sourced 72 are posted to an online reverse auction site 58. At box 144, electronic bids 102 for sourcing the part 72 are received through the online reverse auction site 58 from a plurality of suppliers 14, 16, 18 and 20. At box 146, a chosen supplier 104 from the plurality of suppliers 14, 16, 18 and 20 is selected based on the electronic bids including prices 102.

The chosen supplier 104 is provided with an option to extend an initial supplier agreement duration 105c by accepting an additional supplier agreement term 105g, at box 148. The workflow management and online reverse auction system 10 may be configured, at box 150, to automatically re-post the electronic part details 74 for the part to be sourced 72 when a trigger condition associated with the part is satisfied.

The system and methods of the present disclosure provide a procurement process having improved competition, reduced complexity, improved quality and higher efficiencies. The workflow management and online reverse auction system not only automates the procurement process on a large scale, but also improves on the unique capabilities of an automated process. That is, the present disclosure provides a means for automating the posting or re-posting of parts to be sourced based on satisfaction of trigger conditions, and a means for negotiating an additional supplier agreement term beneficial to the buyer in exchange for an extended duration of the supplier agreement.

In some cases, the workflow management and online reverse auction system may also be used to track the savings or cost efficiencies achieved by using the system. For example, an initial "closed bid" reverse auction may represent a first phase of the implementation. This phase more closely resembles a previous procurement process. That is, a limited number of suppliers may place bids, and the lowest bid is selected. This lowest bid may be the starting point for the reverse auction process of the present disclosure. The winning bid from the reverse auction process may be subtracted from the lowest bid and multiplied by the amount of parts to be supplied to calculate the cost savings.

Also, to prevent suppliers from taking advantage of the system, an incentive may be provided. For instance, the system could "kick out" or remove suppliers entering a price a predetermined amount or percentage above the lowest blind bid. It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A non-transitory computer readable medium storing instructions that cause one or more processors to execute steps of:
   posting electronic part details for a part to be sourced to an online reverse auction site;
   receiving electronic bids, including prices for supplying the part to be sourced through the online reverse auction site, from a plurality of suppliers;
   selecting a chosen supplier, from the plurality of suppliers, based on the electronic bids; and
   providing an option for the chosen supplier to extend an initial supplier agreement duration by accepting an additional supplier agreement term beneficial to a buyer;
   monitoring whether a trigger condition associated with the part is satisfied; and
   automatically re-posting the electronic part details for the part to be sourced based on the monitoring determining that the trigger condition associated with the part is satisfied,
   wherein the trigger condition is an expiration of the initial supplier agreement duration.

2. The non-transitory computer readable medium of claim 1, wherein the option to extend the initial supplier agreement duration includes accepting a cost reduction term as the additional supplier agreement term.

3. The non-transitory computer readable medium of claim 1, wherein the chosen supplier is selected after expiration of a predetermined period of time.

4. The non-transitory computer readable medium of claim 1, wherein the instructions further cause the one or more processors to:

provide an electronic summary of the electronic bids for an electronic account corresponding to the buyer.

5. The non-transitory computer readable medium of claim 1, wherein the instructions further cause the one or more processors to:
automatically direct the electronic part details to an electronic account corresponding to a qualified supplier.

6. The non-transitory computer readable medium of claim 5, wherein the instructions further cause the one or more processors to:
select the qualified supplier from an electronic supplier matrix based on the electronic part details.

7. The non-transitory computer readable medium of claim 1, wherein the instructions further cause the one or more processors to:
automatically supply print attributes, corresponding to the part, from a parts database.

8. A workflow management and online reverse auction system including:
a memory; and
one or more processors to:
monitor whether a trigger condition associated with a part is satisfied,
wherein the trigger condition is an expiration of an initial supplier agreement duration;
automatically re-post electronic part details for the part to an online reverse auction site based on the monitoring determining that the trigger condition associated with the part is satisfied;
receive electronic bids, including prices for supplying the part through the online reverse auction site, from a plurality of suppliers; and
select a chosen supplier, from the plurality of suppliers, based on the electronic bids.

9. The workflow management and online reverse auction system of claim 8, wherein the one or more processors are further to:
provide an option for the chosen supplier to extend the initial supplier agreement duration by accepting an additional supplier agreement term beneficial to a buyer.

10. The workflow management and online reverse auction system of claim 8, wherein the one or more processors are further to:
provide an option to extend the initial supplier agreement duration by accepting a cost reduction term as an additional supplier agreement term.

11. The workflow management and online reverse auction system of claim 8, wherein the electronic part details are re-posted at the expiration of the initial supplier agreement duration.

12. The workflow management and online reverse auction system of claim 8, wherein the one or more processors are further to:
receive an indication that part orders for the part have increased a predetermined amount.

13. The workflow management and online reverse auction system of claim 8, wherein the one or more processors are further to:
receive an indication that part orders for the part have increased a predetermined amount for a supplier agreement having a year-to-year term.

14. A method for providing a workflow management and online reverse auction system, including:
posting electronic part details for a part to be sourced to an online reverse auction site;
receiving electronic bids, including prices for supplying the part to be sourced through the online reverse auction site, from a plurality of suppliers;
selecting a chosen supplier, from the plurality of suppliers, based on the electronic bids;
providing an option for the chosen supplier to extend an initial supplier agreement duration by accepting an additional supplier agreement term beneficial to a buyer;
monitoring whether a trigger condition associated with the part is satisfied; and
automatically re-posting the electronic part details for the part to be sourced based on the monitoring determining that the trigger condition associated with the part is satisfied,
wherein the trigger condition is expiration of the initial supplier agreement duration.

15. The method of claim 14, wherein providing the option to extend the initial supplier agreement duration includes:
providing the option to extend the initial supplier agreement duration by accepting a cost reduction term as the additional supplier agreement term.

16. The method of claim 14, wherein the electronic part details are re-posted at the expiration of the initial supplier agreement duration.

17. The method of claim 14, further including:
automatically re-posting the electronic part details upon receipt of an indication that part orders for the part have increased a predetermined amount.

18. The method of claim 14, wherein the chosen supplier is selected after an expiration of a predetermined period of time.

19. The method of claim 14, further including:
extracting the electronic part details from a parts database before posting the electronic part details.

20. The method of claim 14, further including:
removing one or more suppliers, of the plurality of suppliers, from the online reverse auction site based on entry of other bids by the one or more suppliers.

* * * * *